C. A. SHELLBERG.
BALL BEARING.
APPLICATION FILED DEC. 29, 1914.

1,154,444.

Patented Sept. 21, 1915.

Witnesses
Frederick H. Ely

Inventor
Carl A. Shellberg.
By Victor J. Evans
Attorney

UNITED STATES PATENT OFFICE.

CARL A. SHELLBERG, OF ELGIN, ILLINOIS.

BALL-BEARING.

1,154,444.　　　　　Specification of Letters Patent.　　Patented Sept. 21, 1915.

Application filed December 29, 1914. Serial No. 879,520.

*To all whom it may concern:*

Be it known that I, CARL A. SHELLBERG, a citizen of the United States, residing at Elgin, in the county of Kane and State of Illinois, have invented new and useful Improvements in Ball-Bearings, of which the following is a specification.

The invention relates to ball bearings wherein the balls are held in a novel manner to minimize friction and to assure perfect lubrication thereof, the balls being arranged for free movement without any interference with each other.

Another object of the invention is the provision of a ball bearing wherein the balls are confined to render the bearing dust-proof, the housing for the bearing balls being of novel form for compactness and durability.

A further object of the invention is the provision of a bearing of this character which is simple in construction, reliable and efficient in use, and inexpensive in manufacture.

With these and other objects in view, the invention consists in the construction, combination and arrangement of parts as will be hereinafter fully described, illustrated in the accompanying drawing, and pointed out in the claims hereunto appended.

Figure 1:
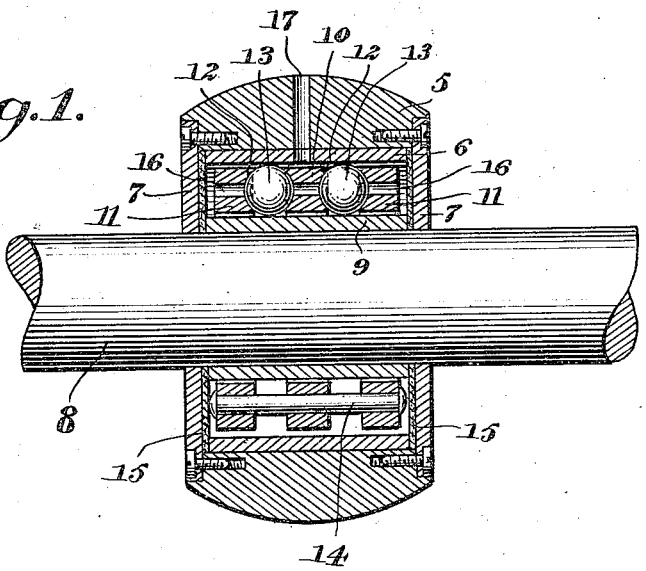
Figure 2:
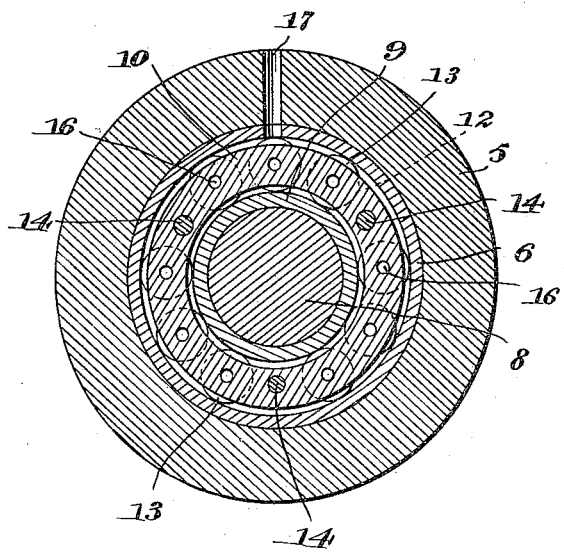
Figure 3:
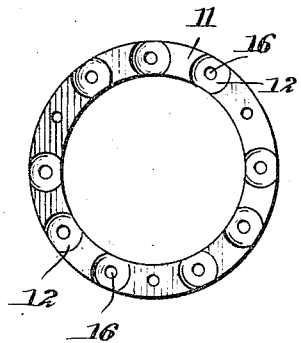

In the drawing Figure 1 is a vertical transverse sectional view through a bearing constructed in accordance with the invention. Fig. 2 is vertical longitudinal sectional view thereof. Fig. 3 is a side view of one of the ball disks of the cage.

Similar reference characters indicate corresponding parts throughout the several views in the drawing.

Referring to the drawing in detail, the ball bearing comprises a hub 5 formed with a ball for receiving a sleeve 6 which is of less width than the hub, the latter being provided with rabbeted side edges to accommodate the side disks or cheeks 7 which are fastened thereto in any suitable manner, preferably by means of screws passed therethrough and detachably engaged in the said hub so that access may be had to the interior of the latter on the removal of either disk or cheek. The rabbeted edges form seats for the disks or cheeks so that the latter will be flush with the side edges of the hub.

The disks or cheeks 7 are centrally apertured to receive an axle or shaft 8, which has fitted thereon a wearing collar or bushing 9 between which and the sleeve are located the bearing balls and cage therefor hereinafter fully described.

The cage comprises intermediate and outer rings 10 and 11, respectively, which are disposed concentrically about the collar or bushing 9 and have formed in faces opposite each other of the respective rings at intervals thereof pockets 12 correspondingly shaped to and receiving the ends of bearing balls 13, which pockets intersect the inner and outer peripheries of the rings 10 and 11 so that the balls 13 will be exposed for travel on the bushing and sleeve, respectively.

Passed through the rings 10 and 11 are tie bolts 14 which are riveted at their ends for the uniting of the said rings together to form the cage.

Disposed against the inner sides of the disks or cheeks 7 are fiber or felt washers 15, while formed in the rings are vents 16, those in the intermediate ring being designed to establish communication between the pockets in opposite sides thereof, and those in the outer rings opening through the outer faces thereof and centrally of the pockets therein so that lubricant will be fed to and from the pockets through the vent, the washers being designed to distribute the lubricant which is introduced through an oil passage 17 formed in the hub 5 and opening through the outer periphery thereof, the sleeve interiorly of the hub being formed with an aperture alining with the oil passage in the said hub so that the oil will be admitted to the bearing balls within the cage therein.

What is claimed is:—

1. A ball bearing comprising outer and inner revoluble members, sleeves fitted within the outer member and upon the inner member, a plurality of rings concentrically disposed about the sleeve on the inner member and having holes at intervals therein registering with each other, bearing balls interposed between the rings, the said rings being formed with sockets communicating with the holes and receiving the bearing balls, and bolts passed transversely through the rings at points between certain of the bearing balls for connecting the said rings in unison, the said balls being of a size to protrude beyond the inner and outer peripheries of the rings for contact with the sleeves.

2. A ball bearing comprising outer and inner revoluble members, sleeves fitted within the outer member and upon the inner member, a plurality of rings concentrically disposed about the sleeves on the inner member and having holes at intervals therein registering with each other, bearing balls interposed between the rings, the said rings being formed with sockets communicating with the holes and receiving the bearing balls, bolts passed transversely through the rings at points between certain of the bearing balls for connecting the said rings in unison, the said balls being of a size to protrude beyond the inner and outer peripheries of the rings for contact with the sleeves, and cheek plates detachably connected to opposite ends of the outer member and disposed concentrically about the inner member.

In testimony whereof I affix my signature in presence of two witnesses.

CARL A. SHELLBERG.

Witnesses:
C. R. HOPSON,
R. D. HOLLENEBEAK.

Copies of this patent may be obtained for five cents each, by addressing the "Commissioner of Patents, Washington, D. C."